W. G. Brown,
Reel.

No. 85,065.      Patented Dec. 22, 1868.

Witnesses.      Inventor.

WILLIAM G. BROWN, OF CANTON, NEW YORK.

Letters Patent No. 85,065, dated December 22, 1868.

IMPROVEMENT IN REEL.

The Schedule referred to in these Letters Patent and making part of the same.

*To all whom it may concern:*

Be it known that I, WILLIAM G. BROWN, of Canton, in the county of St. Lawrence, and State of New York, have invented a new and useful Improvement in Swifts; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
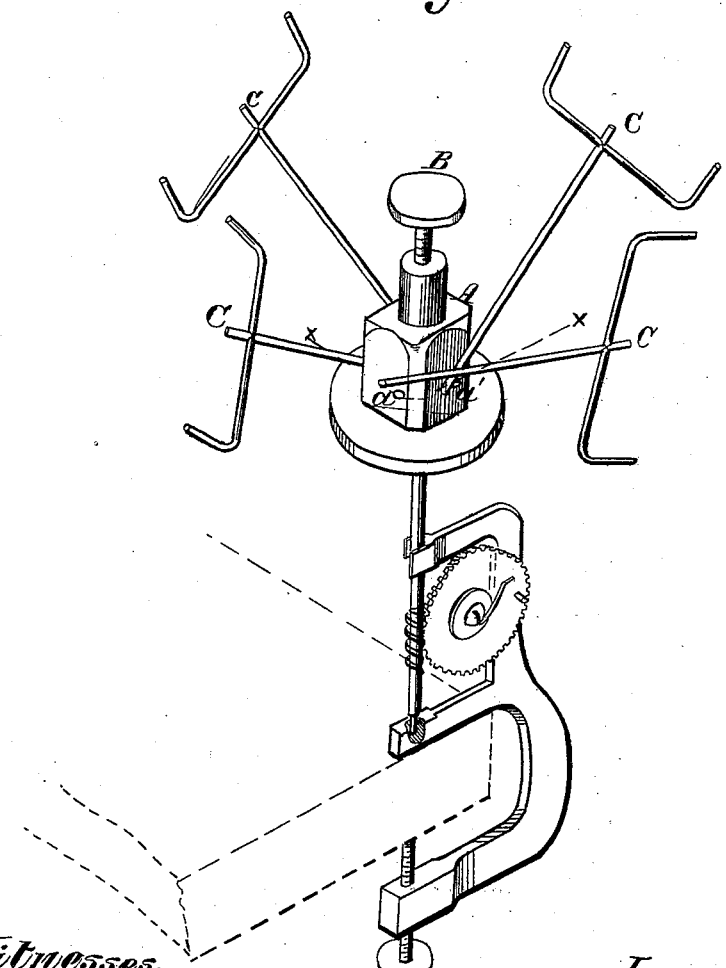
Figure 1 represents a perspective view of my improved swift.
Figure 2:
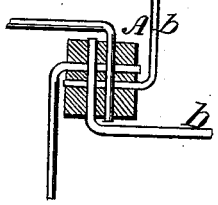
Figure 2 represents a horizontal section on the line $x\,x$ of fig. 1.

The object of this invention is to provide an improved swift, which can be adjusted to skeins of any length, and which may carry more than one skein at once.

It consists in providing the reel-head with two sets of round axial holes, parallel with each other, through the same horizontally, and at right angles to each other, one set being higher than the other, in which the right-angled arms are secured by a set-screw, tapped into the ends of the shaft, in such a manner that the outer ends may be elevated or depressed, to vary the sweep of the same, by oscillating the inner ends in their bearings under the set-screw.

The reel-arms are provided with a central prolongation, whereby two skeins may be operated at once.

A represents the reel-head, which is pierced radially by the two sets of arm-holes $a$ and $a'$, the holes $a'$ being sufficiently above the set $a$ to admit the arms passing through them to pass above the others.

The ends of the arms $b$, which enter the said holes, are bent at right angles to the main part, and are secured in position by a set-screw, B, tapped into the end of the reel-head.

The heads of the arms for supporting the skeins are divided into two parts by the prolongations $c$ of the main portions, whereby two skeins may be supported and reeled at the same time, of different lengths.

When it is desired to vary the sweep of the arms, it is only necessary to relieve the ends of the arms in the reel-head from the holding-pressure of the set-screw, when they may be adjusted to the size of the skein by either raising or lowering the outer ends. The set-screw being then tightened down upon the upper arms, and forcing them down upon the others, clamps the whole together.

Having thus described my invention,

I claim as new, and desire to secure by Letters Patent—

The combination of the right-angled arms, having their heads provided with the prolongation $c$, with the reel-head, provided with the sets of holes $a$ and $a'$, and the set-screw B, all constructed substantially as and for the purpose set forth.

WM. G. BROWN.

Witnesses:
G. RENO,
E. M. COLLINS.